United States Patent [19]

Camilleri

[11] 4,310,149
[45] Jan. 12, 1982

[54] SHOCK ABSORBER

[75] Inventor: Thomas M. Camilleri, Brooklyn, N.Y.

[73] Assignee: Sycam Advanced Technology Corp., East Meadow, N.Y.

[21] Appl. No.: 143,813

[22] Filed: Apr. 23, 1980

Related U.S. Application Data

[63] Continuation-in-part of Ser. No. 024,947, Mar. 29, 1979, Pat. No. 4,251,064.

[51] Int. Cl.$^3$ .............................................. F16F 3/00
[52] U.S. Cl. .................................... 267/136; 188/380
[58] Field of Search ............... 188/1 B, 1 C; 213/44; 267/4, 60, 136, 166, 169, 170, 174, 179

[56] References Cited

U.S. PATENT DOCUMENTS 2,372,214  3/1945  Loepsinger ................... 188/1 B X
3,228,492  1/1966  Blumrich ....................... 188/1 C
4,251,064  2/1981  Camilleri ....................... 267/136

Primary Examiner—Duane A. Reger
Attorney, Agent, or Firm—Hopgood, Calimafde, Kalil, Blaustein & Judlowe

[57] ABSTRACT

A resilient element shock absorber having a casing and a movable rod extending into a bore in the casing. Two bushings are slidably disposed in the bore, and a resilient structure is disposed between the bushings. Upon displacement of the rod in either direction from its neutral position, one of the bushings is displaced inwardly and the resilient structure is compressed. Thus, the resilient structure will oppose any displacement of the rod from its neutral position and the resilient structure will bias the rod towards its neutral position. Adjustment devices are provided for varying the forces exerted by the resilient structure.

19 Claims, 8 Drawing Figures

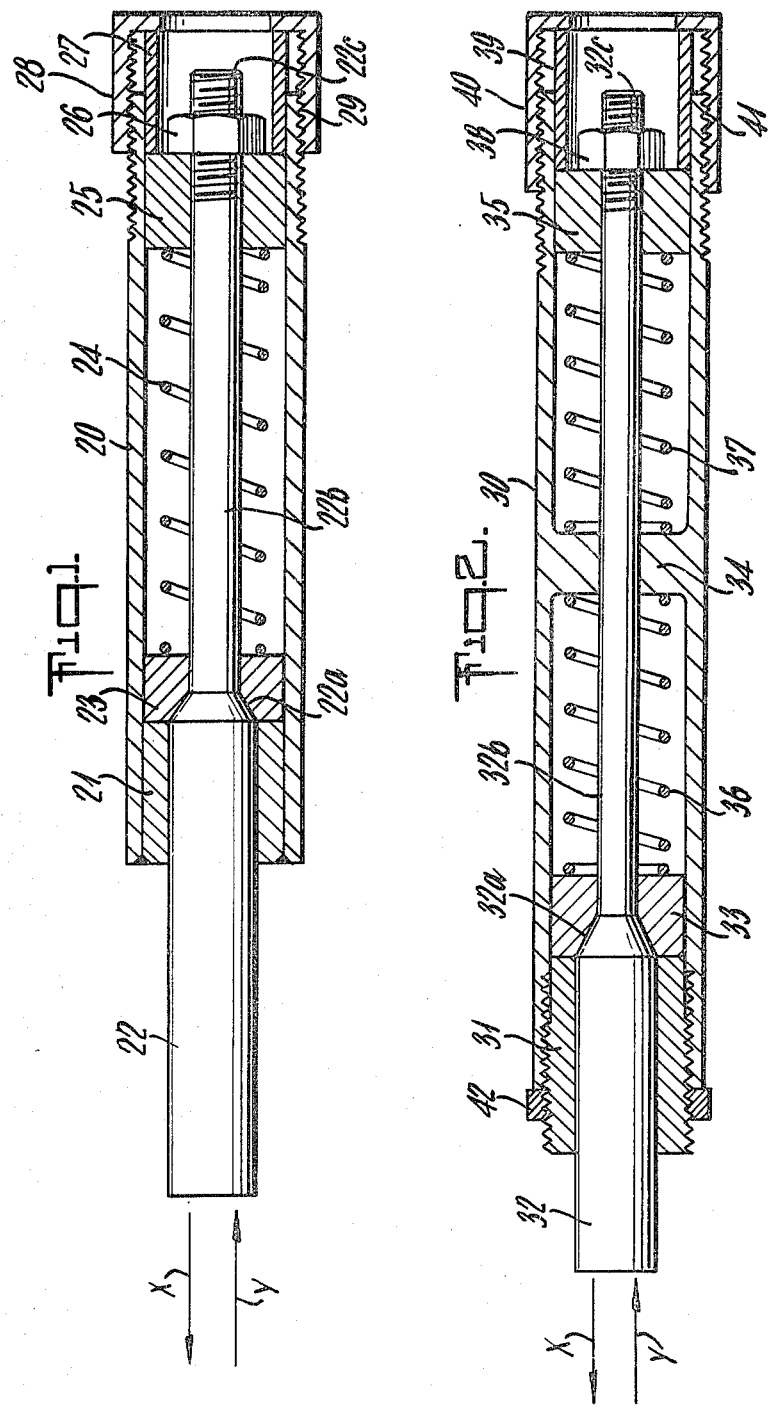

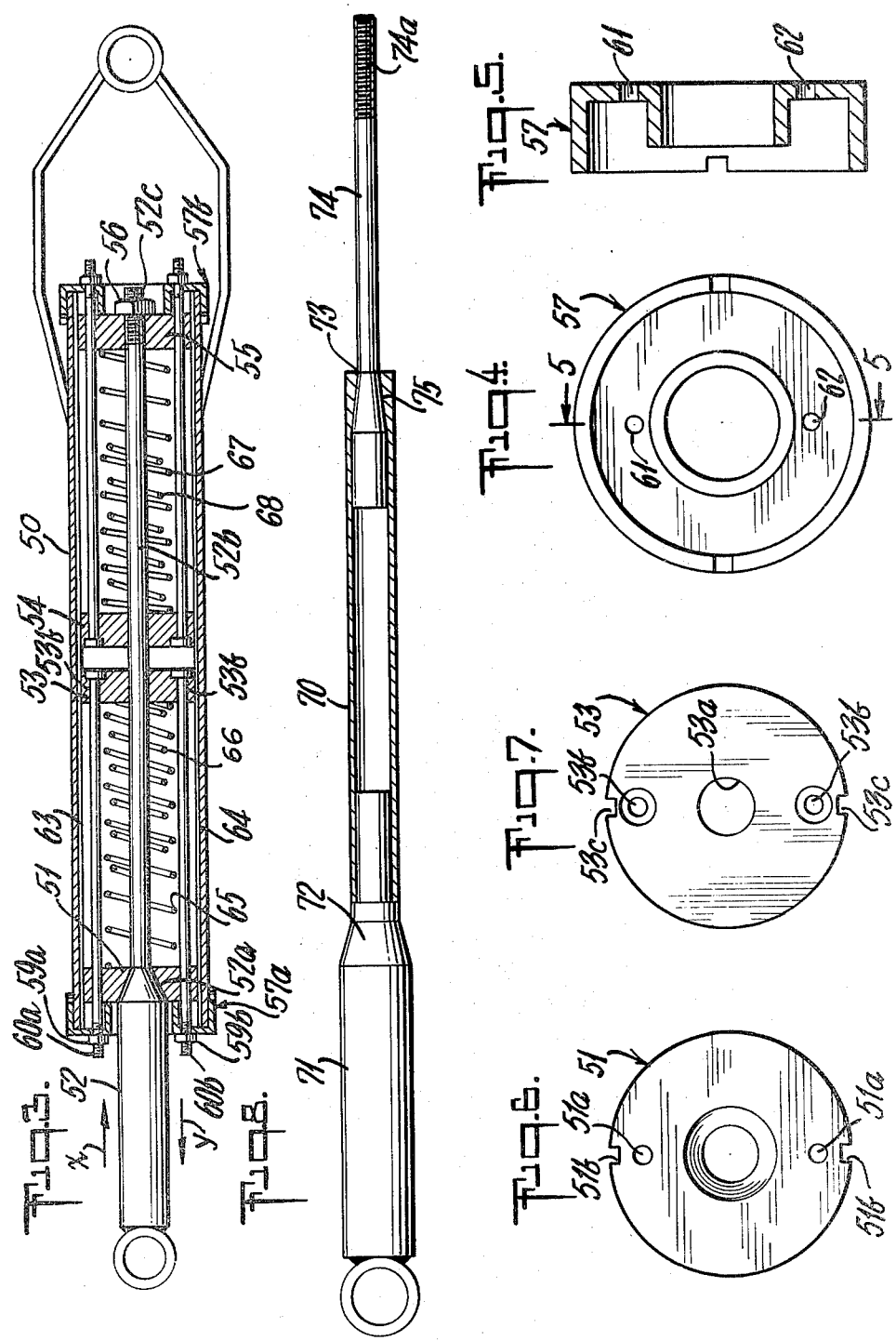

SHOCK ABSORBER

CROSS-REFERENCE TO RELATED APPLICATION

This application is a continuation-in-part of application Ser. No. 24,924 filed Mar. 29, 1979; now U.S. Pat. No. 4,251,064.

BACKGROUND OF THE INVENTION

The present invention relates to a shock absorber having a resilient element.

Shock absorbers are utilized in many different types of machinery to control the relative motion of machine elements. A shock absorber ordinarily includes a casing, a rod moveably mounted to the casing, and resistance devices for opposing displacement of the rod relative to the casing with a predetermined force. In use, the rod is connected to a moveable element of a machine and the casing is connected to a fixed element of the machine so that displacement of the moveable element will produce a corresponding displacement of the rod relative to the casing. Thus, the resistance devices of the shock absorber will oppose displacement of the moveable element of the machine.

SUMMARY OF THE INVENTION

It is an object of the present invention to provide a shock absorber having adjustable resistance to displacement of its rod in either direction relative to its casing.

It is a further object of the present invention to provide a shock absorber which will bias its rod towards a neutral position.

The shock absorber of the present invention includes a casing which defines a bore and a rod which extends into the bore. The rod is supported in the bore for axial movement in either direction from a neutral position. A pair of bushings are slidably mounted in the bore. The bushings are disposed in rest positions adjacent to opposite ends of the bore when the rod is in its neutral position.

As used herein, the term "axially inwardly" should be understood as referring to the directions along the axis of the bore toward the middle of the bore. The term "axially outwardly" should be understood as referring to the directions along the axis of the bore away from the middle of the bore.

Bushing engagement means are provided for connecting a first one of the bushings to the rod for movement therewith upon displacement of the rod in a first direction from its neutral position and for connecting the second one of the bushings to the rod for movement therewith upon displacement of the rod in the second direction from its neutral position. Movement of the rod in either direction from its neutral position will displace one of the bushings axially inwardly from its rest position. A resilient structure is disposed in the bore between the bushings, and means for fixing the resilient structure to the casing are provided. Thus, upon displacement of the rod from its neutral position, one of the bushings will be carried inwardly along the bore with the rod and that bushing will bear on the resilient structure so that the resilient structure will oppose displacement of the rod.

Preferably, abutment means are provided for preventing each of the bushings from moving axially outwardly along the bore beyond its rest position. In one embodiment, the resilient structure includes a single resilient element which is engaged with both of the bushings. Upon displacement of the rod in either direction from its neutral position, one of the bushings will be displaced axially inwardly and the other one of the bushings will be restrained in its rest position by the abutment means. The resilient element will be fixed to the casing by the bushing which is so restrained and the resilient element will be compressed between the bushings.

In another embodiment, the resilient structure includes a pair of resilient elements which are disposed on opposite sides of a support structure which is connected to the casing and which extends across the bore. The resilient elements extend in opposite directions from the support structure to the bushings. Upon displacement of the rod from its neutral position, one of the resilient elements will be compressed between the bushing which is moved axially inwardly by the rod and the support structure.

BRIEF DESCRIPTION OF THE DRAWINGS

FIG. 1 is a sectional view of a shock absorber according to first embodiment of the present invention.

FIG. 2 is a sectional view of a shock absorber according to a second embodiment of the present invention.

FIG. 3 is a sectional view of a shock absorber according to a third embodiment of the present invention.

FIG. 4 is an elevational view of a component of the shock absorber depicted in FIG. 3.

FIG. 5 is a sectional view taken along line 5—5 in FIG. 4.

FIGS. 6 and 7 are each elevational views of additional components of the shock absorber depicted in FIG. 3.

FIG. 8 is a sectional view of a rod according to another embodiment of the present invention.

DETAILED DESCRIPTION OF THE PREFERRED EMBODIMENTS

As shown in FIG. 1, a shock absorber according to a first embodiment of the present invention includes a casing 20 which defines a cylindrical bore. A first bushing 23 and a second bushing 25 are slidably disposed within the bore. A first stop 21 and a second stop 27 are disposed in the bore axially outwardly of the bushings. The first stop 21 is immovably fixed to the casing 20 as by welding. The second stop 27 is retained in the bore of the casing by a cap 28 which threadedly engages the exterior surface of the casing. The bushings, the stops and the cap have holes formed in them; each of these holes is coaxial with the bore of the casing.

A rod 22 extends through the hole in the first stop 21 and through the holes in the bushings 23 and 25 so that the rod is disposed coaxially with the bore of the casing. The rod 22 has an axially inwardly facing conical shoulder 22a, and the first bushing 23 has a mating conical seat formed on its axially outward face. The shoulder of the rod is disposed axially outwardly of the seat. A narrow section 22b of the rod extends from the shoulder 22a to a threaded end 22c of the rod. A nut 26 is threadedly engaged with the threaded end 22c of the rod so that the nut lies axially outwardly of the second bushing 25.

A resilient structure consisting of a single resilient element or coil spring 24 is disposed between the bushings 23 and 25. The coil spring 24 extends coaxially with the bore of the casing and coaxially with the rod so that the turns of the coil spring surround the narrow section 22b of the rod. The coil spring 24 extends continuously between the axially inward faces of the bushings 23 and 25. The undistorted length of the spring is greater than the distance between the bushings when the bushing are in their respective rest positions as illustrated in FIG. 1. Thus, the spring is partially compressed or "preloaded" when the bushings are in their rest positions.

As seen in FIG. 1, the rod 22 is in its neutral position. Each of the bushings 23 and 25 is in its rest position so that the axially outward face of each of the bushings abuts the adjacent stop. The rod 22 can be displaced axially along the bore in either direction from its neutral position. When the rod is displaced in a first direction, indicated by the arrow "y" in FIG. 1, the shoulder 22a of the rod will engage the seat on the first bushing 23, so that the first bushing 23 will be connected to the rod 22 for movement therewith. Thus the first bushing 23 will be displaced axially inwardly and the first bushing 23 will bear on the coil spring 24. The first bushing will tend to move the spring 24 to the right, as seen in FIG. 1. However, the second stop 27 will prevent any movement of the second bushing 25 axially outwardly from its rest position (to the right in FIG. 1). Thus, the right hand end of the coil spring 24 will be retained in position or fixed relative to the casing by the second bushing 25 and the second stop 27. The coil spring 24 will be compressed between the bushings 23 and 25, and the coil spring will oppose the displacement of the rod in the first direction.

If the rod is displaced in the second direction, indicated by the arrow "x" in FIG. 1, the nut 26 on the threaded end 22c of the rod will engage the second bushing 25 so that the second bushing 25 will be connected to the rod 22 for movement therewith in such second direction.

The first stop 21 will prevent any motion of the first bushing 23 axially outwardly from its rest position (to the left in FIG. 1). The left-hand end of the coil spring 24 will bear on the first bushing 23 so that the first bushing 23 and the first stop 21 will fix the left-hand end of the spring relative to the casing 20. Thus, the spring will be squeezed between the bushings and the spring will oppose displacement of rod in the second direction.

Because displacement of the rod 22 in either direction from its neutral position will be opposed by compression of the same spring 24, the force opposing such displacement will be equal for displacements of equal magnitude in either direction from the neutral position of the rod. The forces opposing such displacement may be increased by rotating the nut 26 on the threads of the rod to move the nut and the second bushing 25 axially inwardly while the rod 22 is in its neutral position. This will apply a greater preload to the spring 24. After the position of the bushing 25 has been adjusted in this manner, the cap 28 is adjusted along the threads 29 of the casing so that the second stop 27 just touches the axially outward face of the second bushing 25 when the rod is in its neutral position.

Upon displacement of the rod 22 in the first direction, indicated by the arrow "y" in FIG. 1, the threaded section 22c of the rod, the nut 26 and part of the narrow section 22b of the rod will protrude through the hole in the cap 28. The hole in the cap 28 be omitted if the a pocket of sufficient depth is provided in the cap.

A shock absorber according to an alternate embodiment of the present invention is depicted in FIG. 2. This shock absorber includes a casing 30, a first bushing 33, a second bushing 35, a first stop 31, a second stop 39, a cap 40, a nut 38 and a rod 32, which are similar to the corresponding components of the shock absorber described above. However, the first or left-hand stop 31 of the shock absorber depicted in FIG. 2 is not fixedly connected to the casing 30. It is threadedly engaged with the of the wall of the casing, and a lock nut 42 is provided to hold it in position.

The casing 30 has an integral support structure or wall 34 which extends across the bore between the bushings 33 and 35. The wall 34 has a hole extending through it coaxially with the bore of the casing; the narrow section 32b of the rod extends through this hole.

The resilient structure of the shock absorber depicted in FIG. 2 includes a first coil spring 36 and a second coil spring 37. The first coil spring 36 is disposed coaxially with the rod between the wall 34 and the first bushing 33. The second coil spring 37 is disposed coaxially with the rod on the opposite side of the wall 34 so that the second coil spring 37 extends from the wall 34 to the second bushing 35.

As seen in FIG. 2, the rod 32 is in its neutral position, and each of the bushings is in its rest position. When the rod 32 is displaced from its neutral position in the first direction, indicated by the arrow "y", the conical shoulder 32a will engage the corresponding conical seat on the axially outward face of the first bushing 33. Thus, the first bushing 33 will be connected to the rod for movement therewith and the first bushing 33 will be forced axially inwardly towards the wall 34. The first coil spring 36 will be compressed between the first bushing and the wall. Upon displacement of the rod in the first direction, the nut 38 will be carried away from the second bushing 35, and the second bushing 35 will be retained in position by the second stop 39.

When the rod 32 is displaced from its neutral position in the second direction, indicated by the arrow "x" in FIG. 2, the nut 38 will engage the second bushing 35 so that the second bushing 35 will be connected to the rod for movement therewith. Thus the second coil spring 37 will be compressed between the second bushing 35 and the wall 34. During such displacement of the rod 32, the first bushing 33 will be retained by the first stop 31. The conical shoulder 32a of the rod 32 will move away from the conical seat of the first bushing 33.

As will be readily appreciated, only the first spring 36 will oppose displacement of the rod 32 in the first direction, and only the second spring 37 will oppose displacement of the rod in the second direction.

This shock absorber can be adjusted so that the forces opposing displacement of the rod 32 in either direction from its neutral position are equal, and it can also be adjusted so that the forces opposing displacement of the rod in different directions are unequal.

A shock absorber according to a third embodiment of the present invention is depicted in FIG. 3. This shock absorber includes a casing 50, a rod 52, a first bushing 51, a second bushing 55 and a nut 56 which are similar to the corresponding components of the shock absorber described above with reference to FIG. 2. The stops 57 of the shock absorber depicted in FIG. 3, however, are immovably fixed to the casing 50. Each of these stops defines a hole coaxial with the bore of the casing 50.

The support structure of the shock absorber depicted in FIG. 3 includes a pair of cylindrical collars 53 and 54 which are coaxially slidably received in the cylindrical bore of the casing. As seen in FIG. 7, the first collar 53 has a central hole 53a coaxial with the cylindrical periphery of the collar. The second collar 54 has a similar central hole. The narrow portion 52b of the rod extends through these central holes in the collars.

The first collar 53 has a pair of tie bar holes 53b which extend through it parallel to its axis adjacent to its periphery. The first bushing 51 has a corresponding pair of tie bar holes 51a (FIG. 6) which extend through it from its axially inward face to its axially outward face. Likewise, each of the stops 57 has a pair of tie bar holes 61 and 62 (FIGS. 4 and 5) which extend through it from its axially inward face to its axially outward face. A pair of tie bars 60a and 60b (FIG. 3) extend through the tie bar holes of the first collar 53, the first bushing 51 and the first stop 57a. Each of these tie bars has an enlarged head disposed on the axially inward side of the first collar 53, and a nut 59 is threadedly engaged with each tie bar axially outwardly of the first stop 57a. The tie bars and nuts connect the first collar 53 with the first stop 57a and thus with the casing 50 so that the first collar cannot move axially inwardly along the bore.

To maintain the tie bar holes of the collar, the bushing and the stop in alignment with one another, a pair of guide rods 63 and 64 are fixed to the casing 50 so that they extend along the walls of the bore parallel to the axis of the casing at diametrically opposed locations. The first collar 53 (FIG. 7) has a pair of diametrically opposed notches 53c on its periphery, and the first bushing 51 (FIG. 6) has a corresponding pair of notches 51b at diametrically opposed locations on its periphery. The guide rods are received in the notches 53c of the collar and the notches 51b of the bushing, so that the bushing and the collar cannot rotate within the bore. The tie bar holes of the bushing and the collar will remain in alignment with one another and with the tie bar holes of the stop 57a. Thus, the tie bars 60a and 60b will not interfere with axial motion of the bushing 51.

A similar arrangement of tie bars and nuts is utilized to connect the second collar 54 to the second stop 57b and thus to the casing 50. The second collar 54, the second bushing 55 and the second stop 57b have pairs of tie bar holes similar to those described above. The second collar 54 and the second bushing 55 have pairs of peripheral notches which receive the guide rods 63 and 64 to maintain alignment of the tie bar holes in the second collar 54, the second bushing 55 and the second stop 57b.

The resilient structure of the shock absorber depicted in FIG. 3 includes a first resilient element disposed between the first collar 53 and the first bushing 51. This resilient element includes a main coil spring 65 and an auxiliary coil spring 66. The free or undistorted length of the main coil spring 65 is greater than the distance between the first collar 53 and the first bushing 51 when the first bushing 51 is in its rest position, as depicted in FIG. 3. Thus, the main coil spring 65 is partially compressed or preloaded when the first bushing 51 is in its rest position. The undistorted length of the auxiliary coil spring 66 is less than the distance between the first collar 53 and the first bushing 51 when the first bushing is in its rest position. Thus, the auxiliary coil spring 66 is disengaged from the first bushing 51 when the first bushing is in its rest position.

A second resilient element is disposed between the second collar 54 and the second bushing 55. Like the first resilient element, the second resilient element includes a main coil spring 67 which has an undistorted length greater than the distance between the bushing and the collar when the bushing is in its rest position and an auxiliary coil spring 68 which has an undistorted length less than such distance. When the second bushing 55 is in its rest position as shown in FIG. 3, the main coil spring 67 will be partially compressed between the second bushing 55 and the second collar 54, but the auxiliary coil spring 68 will be disengaged from second bushing 55.

The preload on each of the main coil springs may be adjusted to tightening or loosening the nuts on the tie bars which connect the associated collar to a stop. The preload on each of the main coil springs can be adjusted without altering the preload on the other one of the main coil springs, and without altering the neutral position of the rod 52.

Displacement of the rod 52 in the first direction, indicated by the arrow X in FIG. 3, will be opposed by the first resilient element. Small displacements of the rod 52 in this direction will be opposed only by the main coil spring 65 of the first resilient element. However, once the rod 52 has been displaced in the first direction far enough to move the first bushing 51 into engagement with the auxiliary coil spring 66 of the first resilient element, further displacement of the rod 52 in the first direction will be opposed by the auxiliary coil spring 66 and the main coil spring 65 of the first resilient element.

Likewise, small displacements of the rod 52 in the small displacement of the rod 52 in the second direction, indicated by the arrow "y" in FIG. 3, will only be opposed by main coil spring 67 of the second resilient element, but greater displacements in this second direction will be opposed by the main coil spring 67 and the auxiliary coil spring 68 of the second resilient element.

When the rod 52 is displaced in the first direction (to the right in FIG. 3), its first or lefthand end will move axially into the casing and its second or righthand end 52c will move axially outwardly from the casing through the central hole in the second stop 57b. If other structures of the machine in which the shock absorber is utilized are in close proximity to the second or righthand end of the casing, the second end of the rod may interfere with such structures when the rod is so displaced.

To eliminate any possibility of such interference, the telescopic rod depicted in FIG. 8 may be substituted for the rod 52. This telescopic rod includes a tubular portion 70 and a further portion 74 which is telescopically received in the tubular portion. Extension of the further portion 74 from the tubular portion 70 is limited by a conical seat 73 formed at the tip of the tubular portion 70 and a mating conical head 75 formed integrally with the further portion 74. The rod also includes a shank 71 which is fixedly connected to the tubular portion 70. The shank 71 has a conical shoulder 72. Thus, the conical shoulder 72 is in fixed relation with the tubular portion 70 of the rod. Threads 74a are formed on the outboard end of the further portion 74.

As stated above, the rod depicted in FIG. 8 may be utilized in the shock absorber depicted in FIG. 3 in place of the rod 52 shown in FIG. 3. When the shank 71 of the rod is displaced in the first direction, indicated by the arrow "x" in FIG. 3, the conical shoulder 72 will engage the conical seat of the first bushing 51. However, the further portion 74 will not be displaced with the shank 71. Instead, the further portion 74 will telescope into the tubular portion 70 and the threaded end 74a of the further portion will not protrude beyond the casing. However, when the shank 71 of the rod is displaced from its neutral position in the second direction, indicated by the arrow "y" in FIG. 3, the head 75 of the further portion 74 will engage the seat 73 of the tubular portion 70 so that the further portion 74 of the rod will be displaced along with the shank. A nut engaged on the threaded end 74a of the further portion will engage the second bushing 55.

Numerous variations and combinations of the features described above can be utilized without departing from the present invention. Merely by way of example, elastomeric resilient elements may be substituted for the coil springs described above. Such elastomeric resilient elements can be formed from natural or synethetic rubber or from a urethane elastomer. Also, the telescopic rod depicted in FIG. 8 can be utilized in the shock absorbers depicted in FIGS. 1 and 2. Therefore, the foregoing description of the preferred embodiments should be taken by way of illustration rather than by way of limitation of the present invention as defined in the claims.

What is claimed is:

1. A shock absorber comprising:
   (a) a casing defining a bore;
   (b) a rod extending within said bore, said rod being supported in said bore for axial movement in either direction from a neutral position;
   (c) a pair of bushings slidably mounted within said bore, said bushings being disposed in rest positions at opposite ends of said bore when said rod is in said neutral position;
   (d) bushing engagement means for connecting a first one of said bushings to said rod for movement therewith upon movement of the rod in a first direction from said neutral position and connecting the second one of said bushings to said rod for movement therewith upon movement of said rod in the second, opposite direction from said neutral position so that movement of said rod in either direction will displace one of said bushings from its rest position axially inwardly along said bore;
   (e) a resilient structure disposed in said bore between said bushings; and
   (f) means for fixing said resilient structure to said casing so that upon displacement of said rod in either direction from its neutral position, the bushing connected to said rod will bear on said resilient structure and said resilient structure will oppose such displacement.

2. A shock absorber as claimed in claim 1 further comprising abutment means for preventing each of said bushings from moving axially outwardly beyond its rest position, in which said resilient structure includes a single resilient element engaged with both of said bushings so that upon movement of said rod and displacement of one of said bushings axially inwardly from its rest position, the other one of said bushings will be retained in its rest position by said abutment means, said resilient element will be fixed to said casing by the bushing which is so retained, and the resilient element will be compressed between the bushings.

3. A shock absorber as claimed in claim 2 in which said resilient element is a coil spring which extends coaxially with said rod.

4. A shock absorber as claimed in claim 2 in which each of said bushings has a hole formed therein, and said rod extends through said holes so that said rod is supported in said bore by said bushings.

5. A shock absorber as claimed in claim 4 in which said bushing engagement means includes an axially inwardly facing shoulder on said rod disposed axially outwardly of one of said bushings and a nut threadedly engaged with said rod axially outwardly of the other one of said bushings.

6. A shock absorber as claimed in claim 2 in which said abutment means includes a pair of stops disposed in said bore axially outwardly of said bushings, one of said stops being immovably fixed to said casing, the other one of said stops being attached to said casing so that its axial location within said bore may be adjusted.

7. A shock absorber as claimed in claim 1 wherein said means for fixing said resilient structure includes a support structure extending across said bore between said bushings, said support structure is connected to said casing, and said resilient structure includes a pair of resilient elements disposed on opposite sides of said said support structure so that when either bushing is displaced axially inwardly from its rest position, one of said resilient elements will be compressed between said bushing and said support structure.

8. A shock absorber as claimed in claim 7 wherein said support structure and each of said bushings have holes formed therein, said holes are coaxial with one another and said rod extends through said holes.

9. A shock absorber as claimed in claim 8 in which said bushing engagement means includes an axially inwardly facing shoulder on said rod disposed axially outwardly of one of said bushings and a nut threadedly engaged with said rod axially outwardly of the other one of said bushings.

10. A shock absorber as claimed in claim 7 in which said support structure includes a wall, said wall being immovably fixed to said casing, further comprising a pair of stops disposed in said bore axially outwardly of said bushings, each such stop being connected to said casing so that its axial location may be adjusted to thereby alter the rest position of the associated bushing.

11. A shock absorber as claimed in claim 7 wherein said support structure includes a pair of collars said collars being axially spaced from one another, each one of said resilient elements extending between one of said collars and one of said bushings, each one of said collars being connected to said casing so that its axial location may be adjusted without altering the axial location of the other one of said collars.

12. A shock absorber as claimed in claim 11 further comprising a pair of stops immovably fixed to said casing and extending into said bore axially outwardly of said bushings.

13. A shock absorber as claimed in claim 12, further comprising two tie bars, each one of said bushings having a tie bar hole extending through it from its axially inward face to its axially outward face, each of said collars being connected to an associated one of said stops by an associated one of said tie bars, each such tie bar extending through the tie rod hole in one of said bushings.

14. A shock absorber as claimed in claim 13 in which each one of said stops has a tie bar hole extending through it from its axially inward face to its axially outward face, each one of said tie bars extends through the tie bar hole in the associated one of said stops, further comprising a nut threadedly engaged with each of said tie bars and bearing on the axially outward face of the associated stop so that each of said tie bars is connected to the associated stop by one of said nuts.

15. A shock absorber as claimed in claim 14 in which said bore, said bushings and said collars are cylindrical, said bushings and collars are disposed in said bore coaxially therewith, further comprising a guide rod fixed to said casing and extending along the wall of said bore parallel to the axis of said bore, each one of said collars and each one of said bushings having a notch formed on its periphery, said guide rod extending through all of said notches so that said guide rod will prevent rotation of said collars and said bushings about the axis of said bore.

16. A shock absorber as claimed in claim 7 in which each one of said resilient elements includes a coil spring extending coaxially with said rod from said support structure to one of said bushings and the undistorted length of each such coil spring is greater than the distance between the support structure and the associated bushing when such bushing is in its rest position.

17. A shock absorber as claimed in claim 16 wherein each one of said resilient elements includes an auxiliary coil spring, each such auxilliary coil spring extends coaxially with said rod and each such auxiliary coil spring has an undistorted length less than the distance between the associated collar and the associated bushing when such bushing is in its rest position, so that each such auxiliary coil spring will be disengaged from the associated bushing when such bushing is in its rest position.

18. A shock absorber as claimed in claim 1 in which each of said bushings has a hole extending through it from its axially inward face to its axially outward face, said rod extends through said holes, said bushing engagement means includes an axially inward facing shoulder on said rod disposed axially outwardly of a first one of said bushings and a nut threadedly engaged with said rod axially outwardly of the second one of said bushings, so that said shoulder will engage said first one of said bushings upon movement of said rod in said first direction and said nut will engage the second one of said bushings upon movement of said rod in said second direction.

19. A shock absorber as claimed in claim 1 in which said rod includes a tubular portion, a further portion telescopically received in said tubular portion and means for limiting extension of said further portion from said tubular portion, said shoulder is fixed to said tubular portion, said further portion extends through the second one of said bushings and said nut is threadedly engaged with said further portion, so that upon motion of said rod from its neutral position in said first direction, said further portion may telescope into said tubular portion.

* * * * *